(12) United States Patent
Herbers et al.

(10) Patent No.: US 11,945,525 B2
(45) Date of Patent: Apr. 2, 2024

(54) RADIAL SEAL FOR A TRACK LINK JOINT

(71) Applicant: Caterpillar Inc., Peoria, IL (US)

(72) Inventors: Brice James Herbers, Peoria, IL (US); Mark J. Kiesel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 242 days.

(21) Appl. No.: 17/445,759

(22) Filed: Aug. 24, 2021

(65) Prior Publication Data
US 2023/0067760 A1 Mar. 2, 2023

(51) Int. Cl.
*B62D 55/088* (2006.01)
*B62D 55/21* (2006.01)

(52) U.S. Cl.
CPC ......... *B62D 55/0887* (2013.01); *B62D 55/21* (2013.01)

(58) Field of Classification Search
CPC ...... B62D 55/20; B62D 55/205; B62D 55/21; B62D 55/215; B62D 55/0887
See application file for complete search history.

(56) References Cited

U.S. PATENT DOCUMENTS

| | | | |
|---|---|---|---|
| 3,731,551 A * | 5/1973 | Nelson | B62D 55/092 305/202 |
| 3,801,163 A | 4/1974 | Khuntia | |
| 3,838,896 A * | 10/1974 | Kawamura | B62D 55/0887 305/104 |
| 4,007,972 A * | 2/1977 | Baylor | B62D 55/0887 277/380 |
| 4,029,366 A | 6/1977 | Baylor | |
| 4,426,091 A | 1/1984 | Baylor | |
| 5,374,115 A | 12/1994 | Ketting | |
| 5,763,956 A * | 6/1998 | Metz | B62D 55/0887 305/102 |
| 6,390,572 B1 | 5/2002 | Idetsu et al. | |
| 6,951,373 B2 | 10/2005 | Akita et al. | |
| 9,840,291 B2 | 12/2017 | Kita | |
| 10,086,889 B2 | 10/2018 | Kita | |
| 2008/0231110 A1* | 9/2008 | Mulligan | B62D 55/0887 305/103 |
| 2008/0265667 A1* | 10/2008 | Livesay | B62D 55/21 305/202 |

(Continued)

FOREIGN PATENT DOCUMENTS

DE 2244408 3/1974

*Primary Examiner* — S. Joseph Morano
*Assistant Examiner* — Emily G. Castonguay

(57) ABSTRACT

In some implementations, a bushing may include a cylindrical body having an at least partially annular configuration. The cylindrical body may define a radial axis and may include an inner circumferential surface, an outer circumferential surface, a first end, and a second end. The inner circumferential surface may be configured to rotatably receive an outer surface of a pin of a track link joint. The outer circumferential surface may be configured to be rotatably received within a first counterbore of a first track link of the track link joint. The bushing may include at least one groove extending radially into the outer circumferential surface around the radial axis. The at least one groove may be configured to receive a first seal of the track link joint. The first seal may form a first radial seal between the outer circumferential surface and a first inner surface of the first counterbore.

20 Claims, 8 Drawing Sheets

(56) References Cited

U.S. PATENT DOCUMENTS

| | | | |
|---|---|---|---|
| 2010/0148575 A1* | 6/2010 | Johannsen | B62D 55/21 |
| | | | 305/201 |
| 2013/0169034 A1* | 7/2013 | Hisamatsu | B62D 55/0887 |
| | | | 384/139 |
| 2015/0061370 A1* | 3/2015 | Akinlua | B62D 55/0887 |
| | | | 305/104 |

* cited by examiner

RADIAL SEAL FOR A TRACK LINK JOINT

TECHNICAL FIELD

The present disclosure relates generally to sealing systems and, for example, to a radial seal for a track link joint.

BACKGROUND

Earth moving, construction and mining equipment and the like are often used in rough, off-road terrain. These machines often employ an endless drive with track shoes that is better able to propel the machines in such environments over obstacles and/or uneven terrain. The track chain assemblies, which may include shoes, are held together by a series of interconnected track links, pins and bushings that are supported on a drive sprocket, idler, and support rollers of the machine. The drive sprocket may drive or convey power to the track chain assembly, causing it to revolve about the idler wheels, resulting in linear motion of the machine.

In some cases, there can be a great deal of tension and loads on the track chain assemblies. As machines become heavier and increase in horsepower, undercarriage link assemblies of the track chain are susceptible to even greater risk of component fatigue and wear. In some cases, one or more seals may be included in the track chain assemblies to allow the various components, such as track links, pins, and/or bushings, to rotate relative to each other while sealing in lubricant to prolong the useful life of the rotating or oscillating joints of the track chain assemblies. Over time, the load exerted on the bushings and pins of track link joints may cause the seals associated with the bushings and track links to become damaged, allowing the lubricant to leak out. This may lead to wear problems for the moving components of the track chain. For example, axial seals may be utilized between an axial end of a bushing and a face of a track link to seal lubricant between an interface of the bushing and a pin on the track link joint. Axial load caused by movement of the bushing may cause these axial seals to be become compressed, which may cause the axial seals to fail.

U.S. Pat. No. 9,840,291 (the '291 patent) discloses a track apparatus that includes a track link, a bushing, a coupling pin, a track shoe plate (shoe plate), and a seal member. The Track apparatus may be configured in an oval shape by coupling, in an endless manner, a plurality of track links having track shoe plate attached thereto. The cylindrical bushing is pressed-fitted into bushing hole of one track link. The coupling pin is inserted into the bushing, and press-fitted into pin hole of the other track link. The seal member is inserted into a larger-diameter part of pin hole of the other track link. One track link and the other track link arranged in the row direction in this way are coupled to each other.

The seal member used for the track link joint in the '291 patent is an axial seal that is located between an axial end of the bushing and a face of the track link. Therefore, axial forces caused due to a movement of the bushing may cause the seal member of the '291 patent to become deformed or compressed. Over time, the deformation and compression of the seal member disclosed by the '291 patent may cause the seal to fail, resulting in lubricant leaking out or material entering a space between the bushing and the coupling pin. This may lead to wear problems for the moving components, such as the bushing and/or the coupling pin, and also may cause the moving components to be unable to move due to material entering into the space between the moving components.

The track link joint sealing system of the present disclosure solves one or more of the problems set forth above and/or other problems in the art.

SUMMARY

In some implementations, a bushing for a track link joint includes a cylindrical body having an at least partially annular configuration, the cylindrical body defining a radial axis, the cylindrical body including an inner circumferential surface, an outer circumferential surface, a first end, and a second end, wherein the inner circumferential surface is configured to rotatably receive an outer surface of a pin of the track link joint, and wherein the outer circumferential surface is configured to be rotatably received within a first counterbore of a first track link of the track link joint. The bushing may include at least one groove extending radially into the outer circumferential surface around the radial axis, wherein the at least one groove is configured to receive a first seal of the track link joint, and wherein the first seal forms a first radial seal between the outer circumferential surface and a first inner surface of the first counterbore.

In some implementations, a track link joint sealing system includes a first track link including: a first body including a first inner surface and a first outer surface; a counterbore extending into the first inner surface of the first body, the counterbore defining a radial axis; and a first bore extending through the first body, the first bore configured about the radial axis. The track link joint sealing system may include a second track link pivotably joined to the first track link via a bushing and a pin, the second track link including a second body and a second bore extending through the second body. The track link joint sealing system may include the bushing rotatably configured within the counterbore and the first bore, the bushing including a first cylindrical body having an at least partially annular configuration, the first cylindrical body including a first inner circumferential surface and a first outer circumferential surface, wherein the first outer circumferential surface is configured to extend through the second bore and is configured to be rotatably received within the counterbore. The track link joint sealing system may include the pin configured within the bushing, the pin including a second cylindrical body, the second cylindrical body including a second outer circumferential surface, wherein the second outer circumferential surface defines a first interface with the first inner circumferential surface, and wherein the pin is configured to at least partially extend through the first bore and the second bore. The track link joint sealing system may include a seal disposed at a second interface between the first outer circumferential surface of the bushing and an inner radial surface of the counterbore, the seal forming a radial seal between the first outer circumferential surface and the inner radial surface of the counterbore, wherein the radial seal is configured to prevent material from entering into, or exiting from, the first interface.

In some implementations, a track link for a track link joint includes a body including an inner surface, an outer surface, a first end, and a second end. The track link may include a bore extending through the body from the inner surface to the outer surface, wherein the bore is displaced proximate to the first end, wherein the bore defines a radial axis, and wherein the bore is configured to rotatably receive a pin of the track link joint. The track link may include a counterbore extending into the inner surface about the radial axis, wherein the counterbore includes an axial surface and an inner radial surface, and wherein the counterbore is configured to rotatably receive a bushing of the track link joint. The track link may include a groove extending radially into the inner radial surface around the radial axis, wherein the groove is configured to receive a seal of the track link joint, and wherein the seal forms a radial seal between the inner surface of the counterbore and an outer circumferential surface of the bushing.

DETAILED DESCRIPTION

Figure 1:
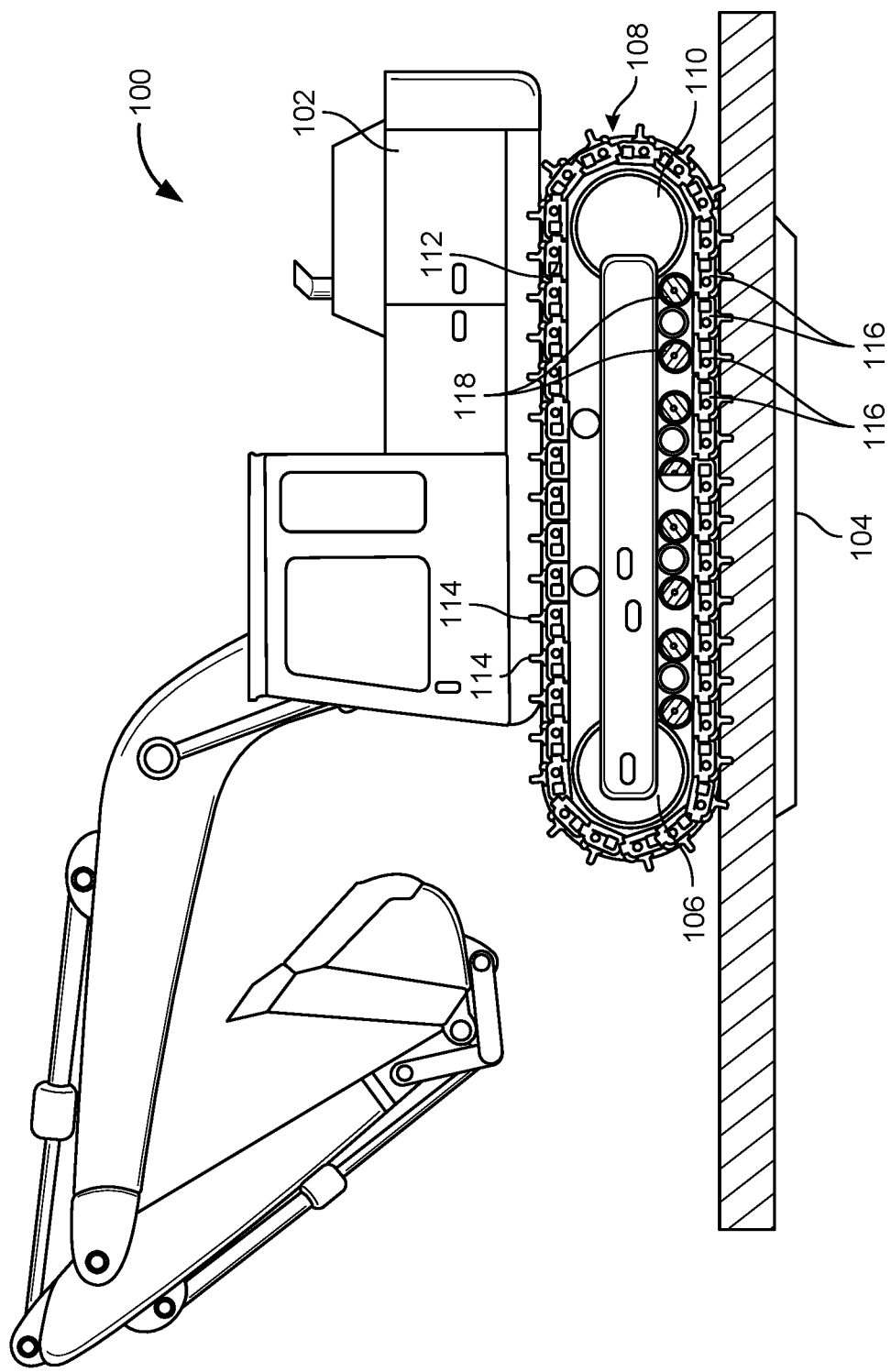
FIG. 1 is a diagram of an example of a machine described herein.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b or by a prime for example, 100', 100". It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this disclosure.

This disclosure relates to a radial seal for a track link joint, which is applicable to any machine that includes a track chain assembly. The track chain assemblies may be used on various track-driven machines. For example, the machine may be an earth moving machine such as an excavator, a dozer, a loader, a backhoe, a motor grader, or any other earth moving machine.

FIG. 1 is a diagram of an example of a machine 100 described herein. The term "machine" may refer to any machine that performs some type of operation associated with an industry such as mining, earth moving or construction, or any other industry known in the art. For example, the machine may be an excavator, a wheel loader, a cable shovel, a track type tractor, a dozer, and/or a dragline, among other examples. Moreover, one or more implements may be connected to the machine. Such implements may be utilized for a variety of tasks, including, for example, lifting and loading. While the arrangement is illustrated in FIG. 1 connection with a hydraulic excavator, the arrangement disclosed herein has universal applicability in various other types of machines that employ track systems, as opposed to wheels.

The machine 100 may include a power source 102 and an undercarriage assembly 104, which may be driven by the power source 102 and supported by one or more idler wheels 106 spaced apart in the undercarriage assembly 104. The power source 102 may drive the undercarriage assembly 104 of the machine 100 at a range of output speeds and torques. The power source 102 may be an engine such as, a diesel engine, a gasoline engine, a gaseous fuel-powered engine, and/or any other suitable engine. The power source 102 may also be a non-combustion source of power such as, a fuel cell, a power storage device, hydraulic motor, electric power cord, and/or another other source of power.

The undercarriage assembly 104 may include two separate continuous tracks 108, one on either side of machine 100 (only one of which is shown in FIG. 1). Each track 108 may be driven by the power source 102 via one or more drive sprockets 110. In addition, each track 108 may include a track chain assembly 112 and a plurality of track shoes 114. Each track shoe 114 may be configured to engage a surface (e.g., the ground). Each track chain assembly 112 may include a plurality of track link assemblies 116. The power source 102 may supply the power to drive the track chain assembly 112 via a sprocket assembly (not shown in FIG. 1), by engaging the various bushings 300 (described in more detail elsewhere herein), propelling the movement of the track chain assembly 112 as described earlier herein.

One or more track rollers 118 may be provided at the bottom of a track 108 to support the tracks 108 and/or the track chain assembly 112. The unique design of tracks 108 and the overall track and undercarriage system of which they are a part are contemplated to enable machine 100 to operate in certain environments such as soft underfoot conditions without the shortcomings associated with many earlier designs.

Figure 2:
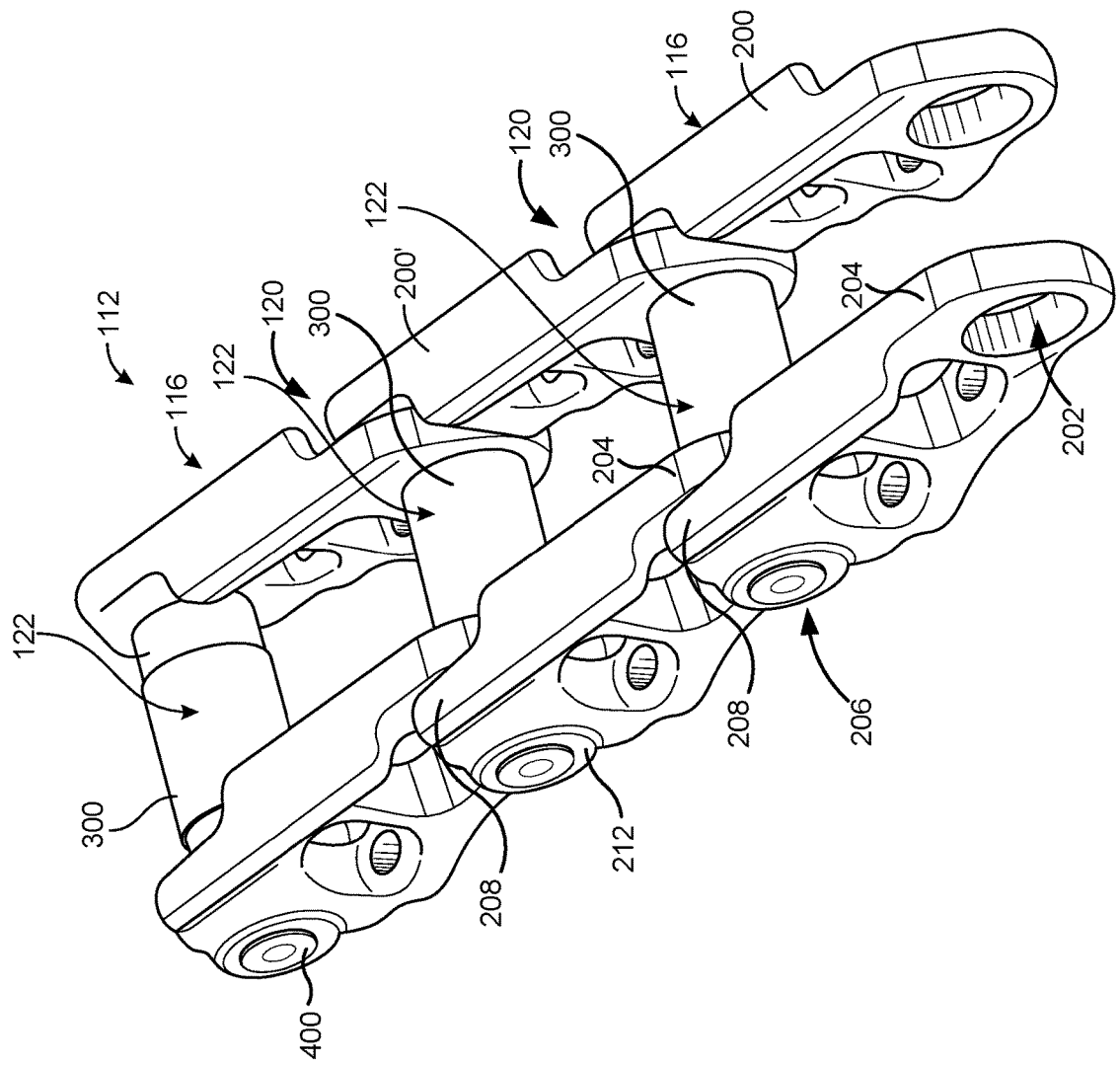
FIG. 2 is a diagram of an example of a track chain assembly described herein.

FIG. 2 is a diagram of an example of a track chain assembly 112 described herein. The track link chain assembly may include one or more track link assemblies 116. Each track link assembly 116 may include a pair of track links 200. The track links 200 may be a pair of offset track links 200 or a respective pair of inner and outer track links when straight track links are used (not shown). Adjacent track link assemblies 116 may be interconnected by way of rod assemblies 122 (e.g., in the form of bushings 300 and/or pins 400). More specifically, each rod assembly 122 may include a bushing 300 disposed about a pin 400. The bushing 300 may have a substantially cylindrical body. The cylindrical body of the bushing 300 may have an at least partially annular configuration. For example, the bushing 300 may be disposed about the pin 400. The pin 400 may have a substantially cylindrical body. A pair of bearings (not shown) that are freely rotatable relative to pin 400 may also be provided in the rod assembly 122.

Each track link assembly 116 may include a track link joint 120. The track link joint 120 may join two track links 200 via a rod assembly 122 (e.g., via a bushing 300 and/or a pin 400). A track link joint 120 may be pivotable and/or rotatable (e.g., about an axis defined by the rod assembly 122 and/or the bushing 300). In other words, the track links 200 may be joined at the track link joint 120 such that the track links 200 are enabled to move relative to one another. A track link joint may include a seal 500 (not shown in FIG. 2) that may be configured to prevent the loss of lubrication and provide freedom of movement for the track link joint 120 and/or the rod assembly 122. The track link joint 120 may differ from other joints in the track link assembly 116 and/or the undercarriage assembly 104 in that the track link joint 120 is a pivotable joint. For example, a joint associated with a track roller 118 may similarly include seals to prevent the loss of a lubricant. However, these joints may not be pivotable and/or the joints may be static. Dynamic joints (e.g., joints that are associated with movement, rotation, and/or pivoting) provide additional challenges for sealing systems, as described herein.

The bushing 300 may be pressed into a first bore 202 of a first end 204 of a track link 200, and the pin 400 may extend through the first end 204 of the track link 200' and be received in a second bore 206 of a second end 208 of the adjacent track link 200. The pin 400 may be retained in the second end 208 of the adjacent track link 200 by being pressed into that track link 200 or by being retained therein using a cotter pin or another similar device when a slip fit is being used. The bushing 300 may pass through the first bore 202 and may be received in the second end 208 of the adjacent track link 200. For example, the track link 200 may include a counterbore 210 (not shown in FIG. 2) extending into the track link 200 that is concentric with the second bore 206. The bushing 300 may be received in the counterbore 210 (the track link 200 is depicted and described in more detail in connection with FIG. 8). Other configurations and methods of assembling the track link assemblies 116 may be provided to create a track chain assembly 112. A plurality of track links 200 may be connected in a manner similar to form the track chain assembly 112.

A rod assembly 122 may interface with bores 202 and 206 of adjacent track links 200, 200' such that consecutively connected link assemblies 116 may be pivotally interconnected to one another to form the track chain assembly 112. For example, an outer end 212 of a track link 200 may mate in fixed manner with the pin 400 (such as when a press fit is employed). The pin 400 may be free to rotate within the bushing 300, such as when some clearance is provided between the pin 400 and a bore of the bushing 300. Consequently, a pair of adjacent track links 200 may be configured to pivot with respect to one another to form an articulating track chain assembly 112. Because the pin 400 may be free to rotate within the bushing 300, a lubricant may be provided in an interface between an inner surface of the bushing 300 and an outer surface of the pin 400 to prevent wear caused by the movement of the components. Therefore, a seal 500 may be disposed within the track link joint 120 to prevent the lubricant from exiting the interface between the bushing 300 and the pin 400 (and/or to prevent material, such as earth, dirt, sand, and/or mud, from entering into the interface between the bushing 300 and the pin 400).

Various small features such as small radii (e.g. 1 millimeter+/−0.1 millimeter or less) that provide a transition from one feature to another may not specifically mentioned but are to be understood as being present in some embodiments. Hence, distances and dimensions are to be measured from theoretical sharp corner to theoretical sharp corner. Moreover, dimensions and/or size ranges provided herein are provided as examples. Other examples of a track link joint 120 may include a radial seal in a similar manner, as described herein, with components or parts having different dimensions than the dimensions provided herein. Also, terms like "radially", "axially" and/or "circumferentially", among other examples may be used to denote directions that are within +/−45 degrees of the respective direction. For example, as used herein, "axial" or "axially" includes a direction that makes an angle of less than 45 degrees with an axial direction. Similarly, "radial" or "radially" includes a direction that makes an angle of less than 45 degrees with a radial direction.

Figure 3:
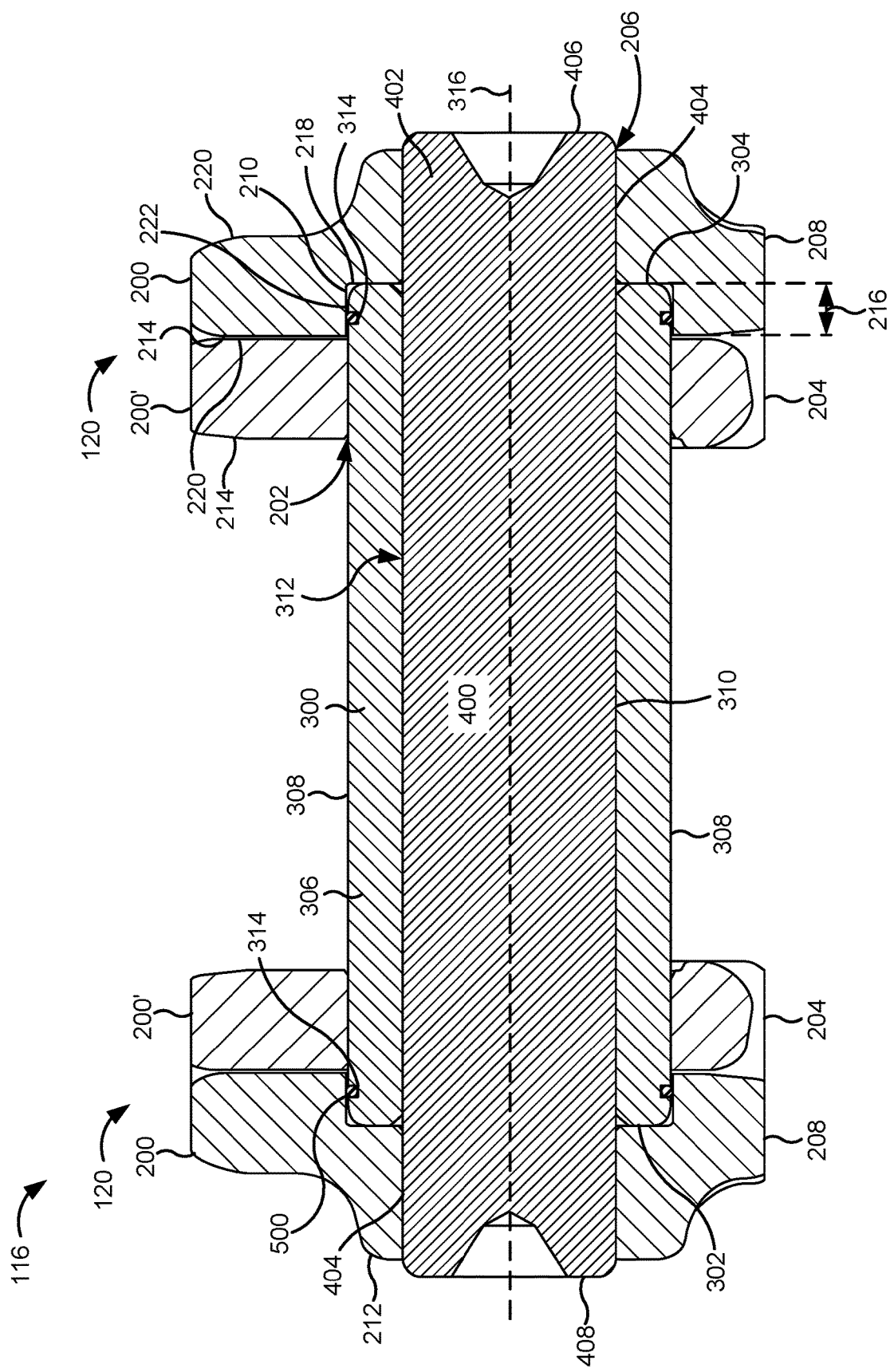
FIG. 3 is a diagram of a cross section view of a track link assembly described herein.

FIG. 3 is a diagram of a cross section view of a track link assembly 116 described herein. The track link assembly 116 may include a first track link joint 120 and a second track link joint 120. For example, as shown in FIG. 3, the first track link joint 120 may be disposed at a first end 302 (e.g., an axial end) of a bushing 300, and the second track link joint 120 may be disposed at a second end 304 (e.g., an opposite axial end) of the bushing 300. The bushing 300 may include a substantially cylindrical body 306 with an at least partially annular configuration (e.g., the bushing 300 may include an aperture or a bore extending axially through the body 306). The bushing 300 may include an outer surface 308 (e.g., an outer radial surface and/or an outer circumferential surface) and an inner surface 310 (e.g., an inner radial surface and/or an inner circumferential surface). As shown in FIG. 3, the body 306 of the bushing 300 may define a radial axis 316 (e.g., a radial direction may be about the radial axis 316 and an axial direction may be along the radial axis 316).

At a track link joint 120, the bushing 300 may be received by a counterbore 210 of a first track link 200. The counterbore 210 may extend into an inner surface 214 of the first track link 200. For example, the counterbore 210 may extend a depth 216 into the inner surface 214 of the first track link 200. The counterbore 210 may be concentric with the second bore 206 of the first track link 200. An axial end (e.g., the first end 302 and/or the second end 304) of the bushing 300 may be configured to mate with (or contact) an axial surface 218 (e.g., an inner face) of the counterbore 210. In some implementations, there may be a gap or space between the axial end of the bushing 300 and the axial surface 218 of the counterbore 210. The bushing 300 and the first track link 200 may be enabled to rotate relative to one another. The bushing 300 may pass through a first bore 202 of a second track link 200'. For example, an outer surface 220 of the second track link 200' may be disposed relative to (e.g., near and/or contracting) the inner surface 214 of the first track link 200. The bushing 300 may be pressed into the first bore 202 (or otherwise fixed to the second track link 200' at the first bore 202). In other words, in some cases, the bushing 300 may not be enabled to rotate relative to the second track link 200'. In some implementations, the bushing 300 may be enabled to rotate relative to the first track link 200 and/or the second track link 200'.

The bushing 300 may be disposed around the pin 400. For example, the pin 400 may be configured within the aperture or the bore that extends axially through the body 306 of the bushing 300. The pin 400 may include a substantially cylindrical body 402. The pin 400 may include an outer surface 404. The outer surface 404 may define a diameter of the pin 400. The diameter of the pin 400 may be based on an inner diameter of the bushing 300. When the pin 400 is configured within the bushing 300, the outer surface 404 of the pin 400 and the inner surface 310 of the bushing 300 may define or form an interface 312. The interface 312 may be a dynamic interface, such that the pin 400 is enabled to rotate (e.g., about the radial axis 316) relative to the bushing 300. Therefore, lubricant may be included in the interface 312 to prevent excessive wear of the pin 400 and/or the bushing 300 caused by the movement.

An axial end of the pin (e.g., a first end 406 and/or a second end 408) may be received by the first bore 202 of the second track link 200' and/or by the second bore 206 of the first track link 200. For example, the pin 400 may pass through the first bore 202 of the second track link 200'. Similarly, the pin 400 may pass through the second bore 206 of the first track link 200. In some cases, the pin 400 may be retained in the second end 208 of the first track link 200 by being pressed into the first track link 200 (e.g., at the outer end 212) or by being retained therein using a cotter pin or another similar device. Therefore, in some cases, the pin 400 may not be enabled to rotate relative to the first track link 200 (e.g., but may be able to rotate relative to the second track link 200'). The pin 400 may be configured to be able to rotate relative to the first track link 200 and the second track link 200'. As a result, the track link joint 120 may form a pivotable joint between the first track link 200 and the second track link 200'. For example, the first track link 200 may pivot or rotate (about the radial axis 316) relative to the second track link 200'. The rotation of the first track link 200 relative to the second track link 200' may range from 0 degrees to approximately 30 degrees (with respect to the radial axis 316). The rotation of the track links 200/200' may cause a rotation of the pin 400 relative to the bushing 300.

As shown in FIG. 3, each track link joint 120 may include a seal 500. The seal 500 may form a radial seal between the outer surface 308 of the bushing and an inner radial surface 222 (e.g., an inner radial surface) of the counterbore 210. The seal 500 may be a radial seal in that the seal 500 extends radially (e.g., about the radial axis 316) around the outer diameter (e.g., around the body 306) of the bushing 300 (e.g., rather than an axial seal that extends about an axial end of the bushing 300). For example, an axial seal (sometimes referred to as an axial face seal) may be a seal located between an axial end of the bushing 300 (e.g., the first end 302 and/or the second end 304) and the axial surface 218 of the counterbore 210. An axial seal may be subject to compressive forces caused by a movement of the bushing 300 in an axial direction (e.g., along the radial axis 316). The radial seal (e.g., seal 500) may not be subject to these compressive forces because the seal is located at a radial interface between the outer surface 308 of the bushing and an inner radial surface 222 of the counterbore 210 (e.g., rather than at an axial interface between an axial end of the bushing 300 and the axial surface 218).

The seal 500 may form a dynamic radial seal. "Dynamic radial seal" may refer to a radial seal that forms a seal between rotating or moving components (e.g., compared to a static radial seal that forms a seal between static or non-moving components). Dynamic radial seals may introduce additional considerations and/or complexities when compared to static radial seals due to the movement or rotation of the components in dynamic radial seals.

The seal 500 may be disposed in a groove 314 of the bushing 300. The groove 314 may be a channel or trench located on the outer surface 308 of the bushing 300. For example, the groove 314 may extend a distance into the outer surface 308. The groove 314 may extend radially (e.g., about the radial axis 316) around the outer surface 308 of the bushing 300. As shown in FIG. 3, the bushing 300 may include a first groove 314 (e.g., located proximate to the first end 302) and a second groove 314 (e.g., located proximate to the second end 304). Each groove 314 may be configured to receive a seal 500. For example, a single bushing 300 may be associated with two track link joints 120 (e.g., as shown in FIG. 3). Therefore, the bushing 300 may include two grooves 314, each groove 314 configured to receive a seal 500 for forming a radial seal for a track link joint 120.

The radial seal formed via the seal 500 may be configured to prevent material from entering into, or exiting from, the interface 312 between the inner surface 310 of the bushing 300 and the outer surface 404 of the pin 400. For example, the seal 500 may be at least partially configured within the groove 314. In other words, at least a portion of a cross section of the seal 500 may extend out of the groove 314. The groove 314 may ensure that the seal 500 remains in place when there is relative movement between the bushing 300 and the first track link 200. The groove 314 may extend at least partially radially outward from the outer surface 308. The seal 500 may be configured to contact the inner radial surface 222 of the counterbore 210 to form the radial seal.

The radial seal formed via the seal 500 may be located at any point along the interface between the outer surface 308 of the bushing 300 and the inner radial surface 222 of the counterbore 210. For example, the seal 500 and/or the groove 314 may be disposed at any point along the interface between the outer surface 308 and the inner radial surface 222 (e.g., until the interface between the inner surface 214 of the first track link 200 and the outer surface 220 of the second track link 200'). This may ensure that lubricant does not leak between the interface between the inner surface 214 of the first track link 200 and the outer surface 220 of the second track link 200'. In other words, the groove 314 may be disposed at a distance from an axial end (e.g., the first end 302 and/or the second end 304) of the bushing 300 that ranges from 0 millimeters (e.g., touching or at the axial end) to a value of the depth 216 (e.g., to ensure that lubricant does not leak between the interface between the inner surface 214 of the first track link 200 and the outer surface 220 of the second track link 200').

The track link assembly 116 depicts track link joints 120 having radial seals where the seal 500 is configured within a groove 314 included in the bushing 300. However, the seal 500 may be configured in the track link joint 120 in other manners. For example, the first track link 200 may include a groove configured to receive the seal 500 (e.g., as depicted and described in more detail in connection with FIGS. 7-10). In some implementations, both the first track link 200 and the bushing 300 may include groove(s) configured to receive the seal 500.

Figure 4:
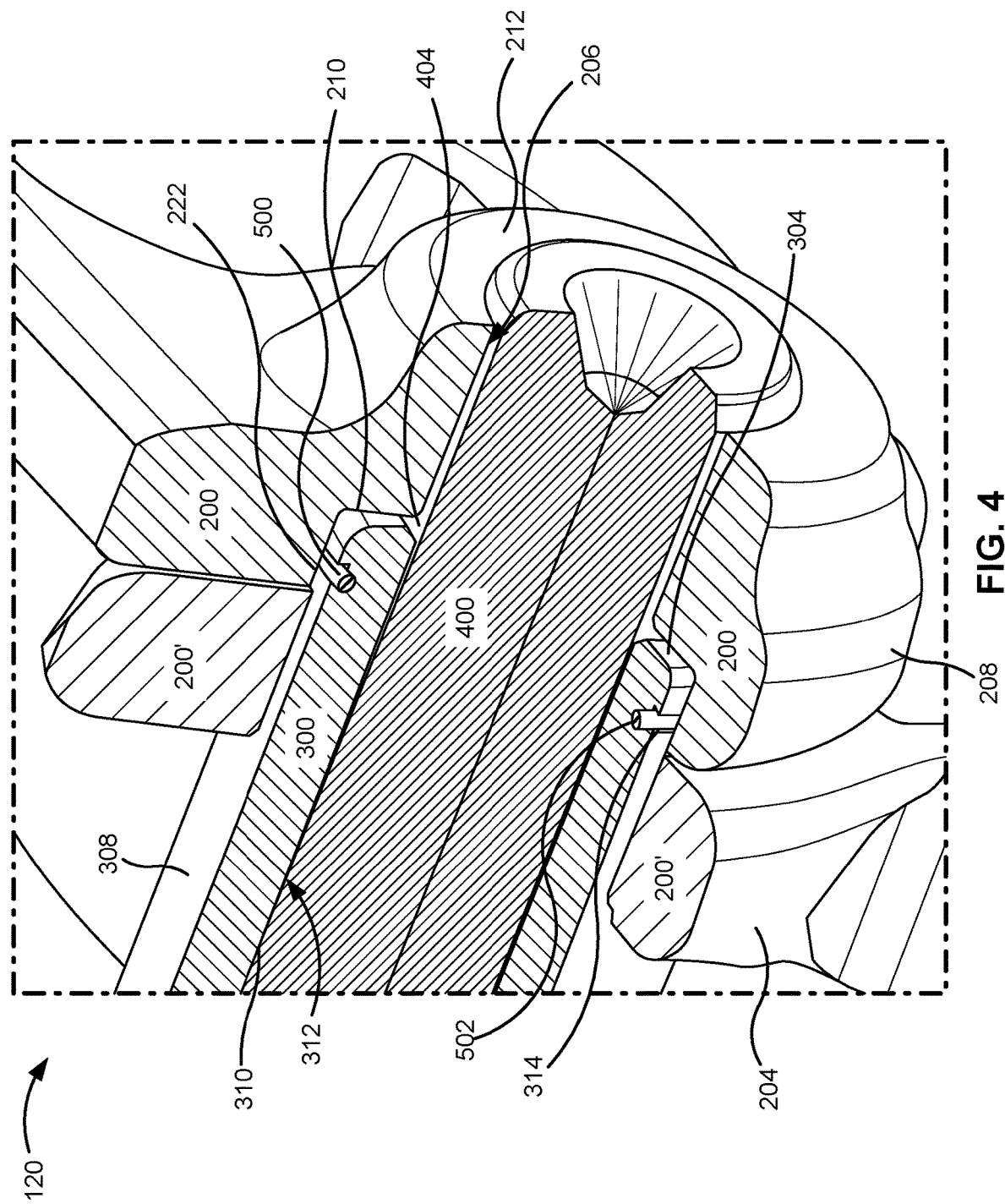
FIG. 4 is a diagram of a cut away view of a track link joint described herein.

FIG. 4 is a diagram of a cut away view of a track link joint 120 described herein. The radial seal formed by the seal 500 may be disposed between the outer surface 308 of the bushing 300 and the inner radial surface 222 of the counterbore 210. The radial seal may prevent lubricant from exiting the interface 312 and/or may prevent material (e.g., earth, dirt, sand, and/or mud) from entering into the interface 312. For example, the bushing 300 may be associated with two radial seals (e.g., as depicted in FIG. 3). Therefore, lubricant may be prevented from exiting from (and/or material may be prevented from entering into) the interface 312 via the interface between the outer surface 308 of the bushing 300 and the inner radial surface 222. Because the pin 400 may be pressed into the outer end 212 of the first track link 200, lubricant may be prevented from exiting from (and/or material may be prevented from entering into) the interface 312 through the interface between the outer surface 404 of the pin 400 and an inner surface of the bore 206. Therefore, the interface 312 may be effectively sealed while enabling movement between components of the track link joint 120 and while preventing compressive forces from being applied to the seal 500.

The seal 500 may have a cross section 502. The cross section 502 may have different geometries and/or shapes. For example, as shown in FIG. 4, the cross section 502 may be substantially circular. The cross section 502 may have a shape of an oval, a rectangle, a square, a T-shape, a P-shape, an "e" shape, a half-circle (e.g., a D-shape), a combination of shapes, and/or any other suitable shape. The seal 500 may include one or more lips, grooves, and/or tongues. The seal 500 may be an O-ring seal, a lip seal, an X-ring seal, a square-ring seal, a delta-ring (or V-ring) seal, and/or a U-cup seal, among other examples. A cross section of the groove 314 of the bushing 300 (and/or a groove of the track link 200 as described in more detail below) may correspond to (e.g., be similar to, the same as, and/or configured to be large enough to receive) a geometry of the cross section 502.

Figure 5:
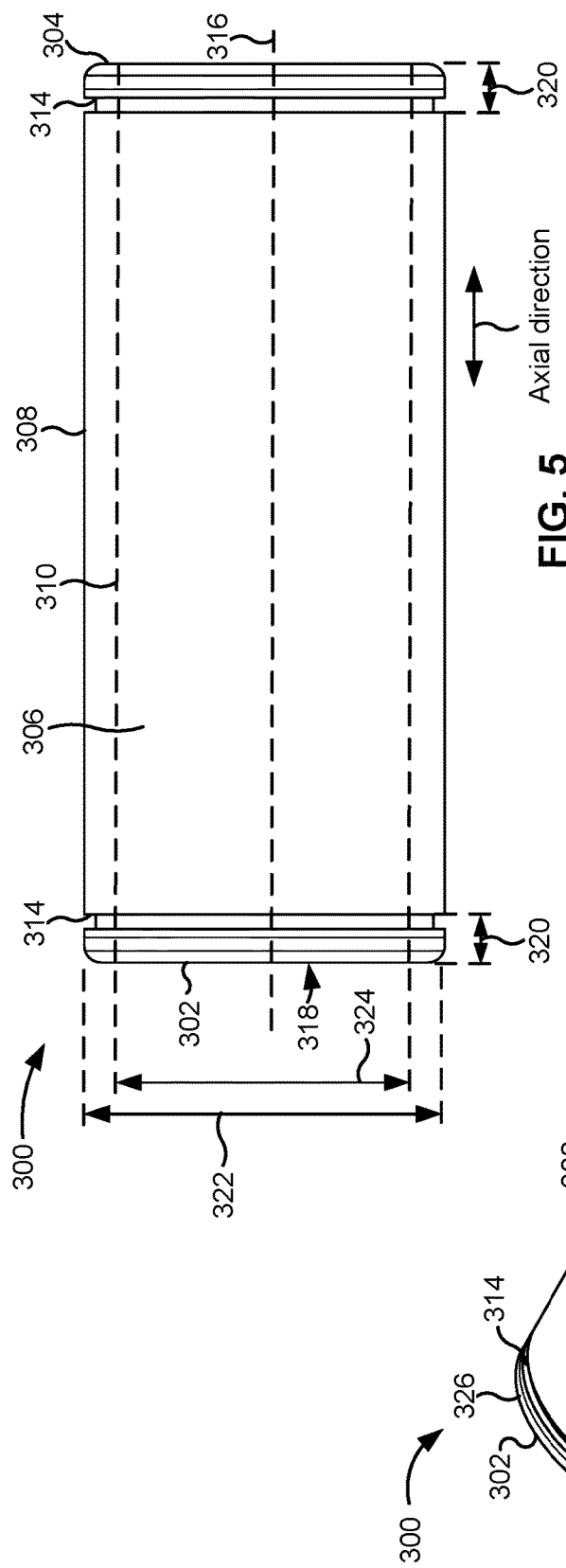
FIG. 5 is a diagram of a side view of a bushing described herein.
Figure 6:
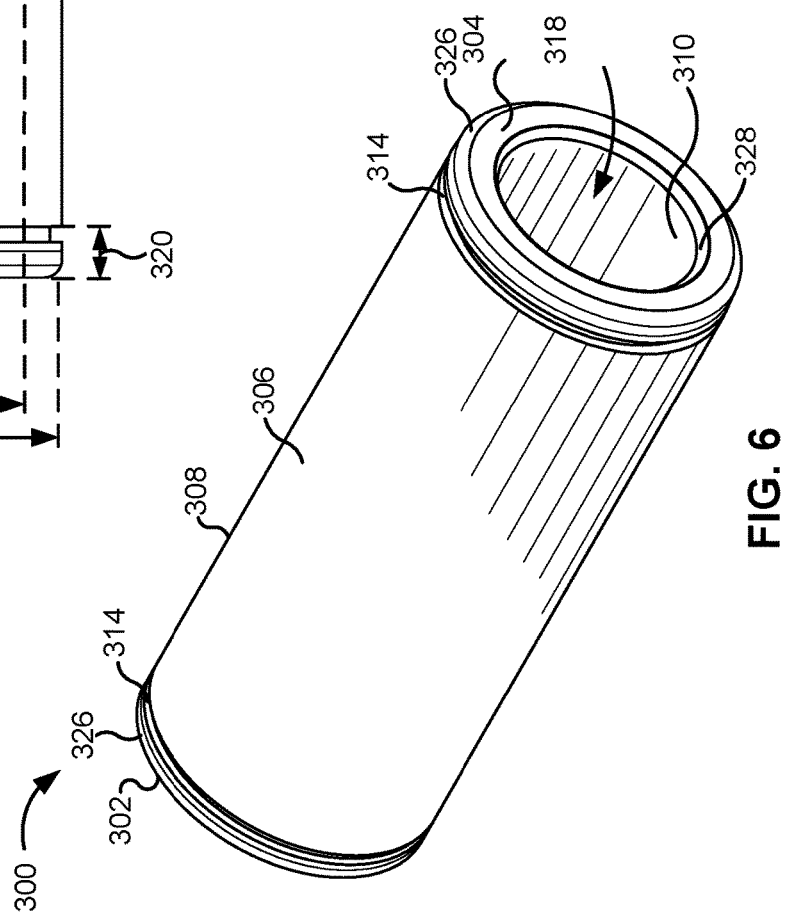
FIG. 6 is a perspective view of a bushing described herein.

FIG. 5 is a diagram of a side view of a bushing 300 described herein. The bushing 300 may include the body 306 (e.g., the cylindrical body) that has an annular configuration defining the radial axis 316. The body 306 may include an outer surface 308 and an inner surface 310 (e.g., which can be seen as depicted in FIG. 6). For example, the bushing 300 may include an aperture 318. The aperture 318 may extend from the first end 302 of the bushing 300 to the second end 304 of the bushing 300. The aperture 318 may be configured to receive (e.g., rotatably receive) the pin 400, as described elsewhere herein.

The outer surface 308 may be configured to be received by a counterbore 210 of a track link 200. For example, the outer surface 308 may be received by a first counterbore 210 of a first track link 200 at the first end 302. Similarly, the outer surface 308 may be received by a second counterbore 210 of a first track link 200 at the second end 304. As shown in FIG. 5, the bushing 300 may include at least one (e.g., two as shown in FIG. 5) groove 314 extending radially into the outer surface 308 around the radial axis 316. For example, the bushing 300 may include a groove 314 located proximate to each axial end of the bushing 300 (e.g., grooves 314 may be located on opposite ends of the bushing 300).

The groove 314 may be disposed a distance 320 from an axial end, along an axial direction defined by the body 306, of the bushing 300. The distance 320 may be a distance from a face of an axial end (e.g., the first end 302 and/or the second end 304) to an end of the groove 314. The distance 320 may be equal to, or less than, the depth 216 of the counterbore 210. For example, the distance 320 may range from 0 millimeters to a value of the depth 216. The depth 216 may range from 8 millimeters to 12 millimeters. In some implementations, the depth 216 may range from 8 millimeters to 20 millimeters (or more). In some examples, the depth 216 may be approximately 9 millimeters. The location of the groove may ensure that a seal 500 that is configured at least partially within the groove forms a radial seal, with an inner radial surface 222 of a counterbore 210, that is located before an interface between the inner surface 214 of the first track link 200 and the outer surface 220 of the second track link 200' (e.g., to ensure lubricant is prevented from leaking via the interface). The groove 314 may be located proximate to an axial end of the bushing 300 to reduce a distance that lubricant is permitted to move along the interface between the outer surface 308 and the inner radial surface 222 of the counterbore 210.

The groove 314 may have a depth (e.g., a distance that the groove 314 extends into the body 306 from the outer surface 308). The depth of the groove 314 may enable the seal 500, when configured in the groove 314, to extend at least partially radially outward from the outer surface 308. For example, the depth of the groove 314 may be based on a size and/or diameter of the seal 500. A width of the groove 314 (e.g., along the axial direction) may vary based on a size and/or diameter of the seal 500. For example, the width of the groove 314 may be equal to or greater than a diameter and/or width of the seal 500. A cross section of the groove 314 may be based on the cross section 502 of the seal 500. For example, when the seal 500 is an O-ring seal, the cross section of the groove 314 may be a rectangular shape and/or a circular or rounded shape. In some implementations, the cross section of the groove 314 may be rectangular (e.g., regardless of the cross section 502).

The outer surface 308 of the bushing 300 may define an outer diameter 322 of the bushing 300. The outer diameter 322 may range from approximately 30 millimeters to approximately 180 millimeters. The inner surface 310 of the bushing 300 may define an inner diameter 324 of the bushing 300. The inner diameter 324 may be a diameter of the aperture 318. The inner diameter 324 may be configured to be a size suitable for receiving the pin 400 (e.g., the inner diameter 324 may be based on a diameter of the pin 400). The inner diameter 324 may range from approximately 20 millimeters to approximately 170 millimeters.

FIG. 6 is a perspective view of a bushing 300 described herein. FIG. 6 depicts the annular configuration of the body 306 of the bushing 300. For example, the inner surface 310 of the bushing 300 may define the inner diameter 324 of the bushing 300 and/or a diameter of the aperture 318.

The bushing 300 may include an outer transitional surface 326 located proximate to each axial end of the bushing 300. As shown in FIG. 6, the outer transitional surface 326 may be a chamfer surface or a tapered surface. The outer transitional surface 326 may be a radial blend in other embodiments. The outer transitional surface 326 may extend from the outer surface 308 of the bushing to an axial end (e.g., the first end 302 and/or the second end 304) of the bushing 300. The outer transitional surface 326 may ease installation when the bushing 300 is installed in the track link joint 120 (e.g., when the bushing 300 is installed within the counterbore 210). The bushing 300 may include an inner transitional surface 328 located proximate to each axial end of the bushing 300. The inner transitional surface 328 may be a chamfer surface or a tapered surface. The inner transitional surface 328 may be a radial blend in other embodiments. The inner transitional surface 328 may extend from the inner surface 310 of the bushing to an axial end (e.g., the first end 302 and/or the second end 304) of the bushing 300. The inner transitional surface 328 may ease installation when the bushing 300 is installed in the track link joint 120 (e.g., when the pin 400 is installed within the bushing 300).

Figure 7:
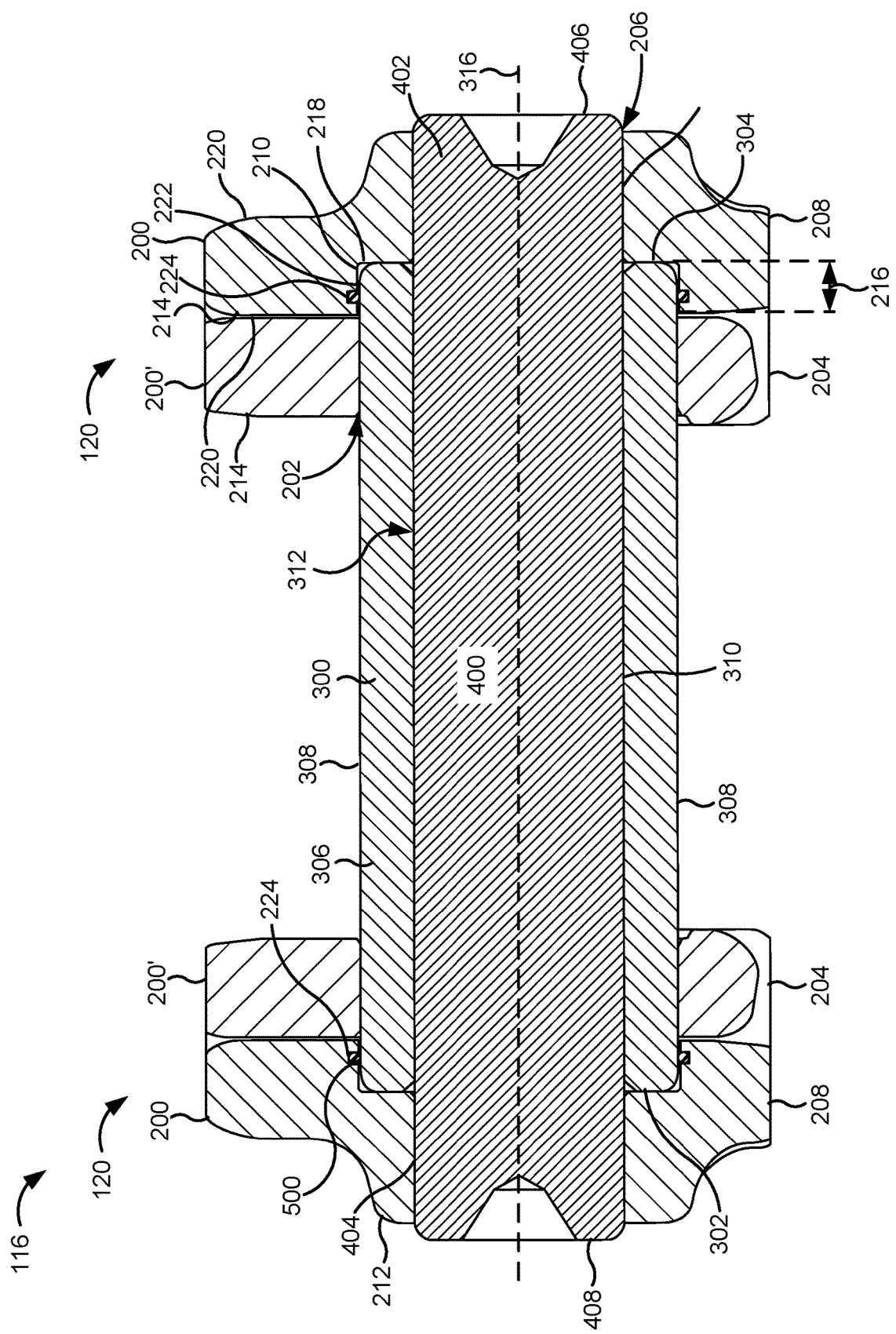
FIG. 7 is a diagram of a cross section view of a track link assembly described herein.

FIG. 7 is a diagram of a cross section view of a track link assembly 116 described herein. The track link assembly 116 may be similar to, or the same as, the track link assembly 116 described above (e.g., in connection with FIG. 3), except that the first track link 200 may include a groove 224 configured to receive the seal 500 (rather than the bushing 300 including the groove (e.g., the groove 314) configured to receive the seal 500). For example, the track link joints 120 of the track link assembly 116 may be configured in a similar manner as described above (e.g., in connection with FIGS. 1-6) and like reference numbers shown in FIG. 7 may have similar descriptions and/or functions as described above.

As shown in FIG. 7, a seal 500 may be disposed in the groove 224 of the first track link 200. The seal 500 may form a radial seal (e.g., a dynamic radial seal) between the outer surface 308 of the bushing 300 and the inner radial surface 222 of the counterbore 210 (e.g., in a similar manner as described above). For example, rather than the seal 500 being disposed in the groove 314 of the bushing 300, the seal 500 may be disposed (e.g., at least partially) in the groove 224 of the first track link 200. In the example track link joint 120 depicted in FIG. 7, the bushing 300 may not include the groove 314. Alternatively, in the example track link joint 120 depicted in FIG. 7, the bushing 300 may include the groove 314 (e.g., the seal 500 may be at least partially disposed in the groove 314 and/or the groove 224).

Figure 8:
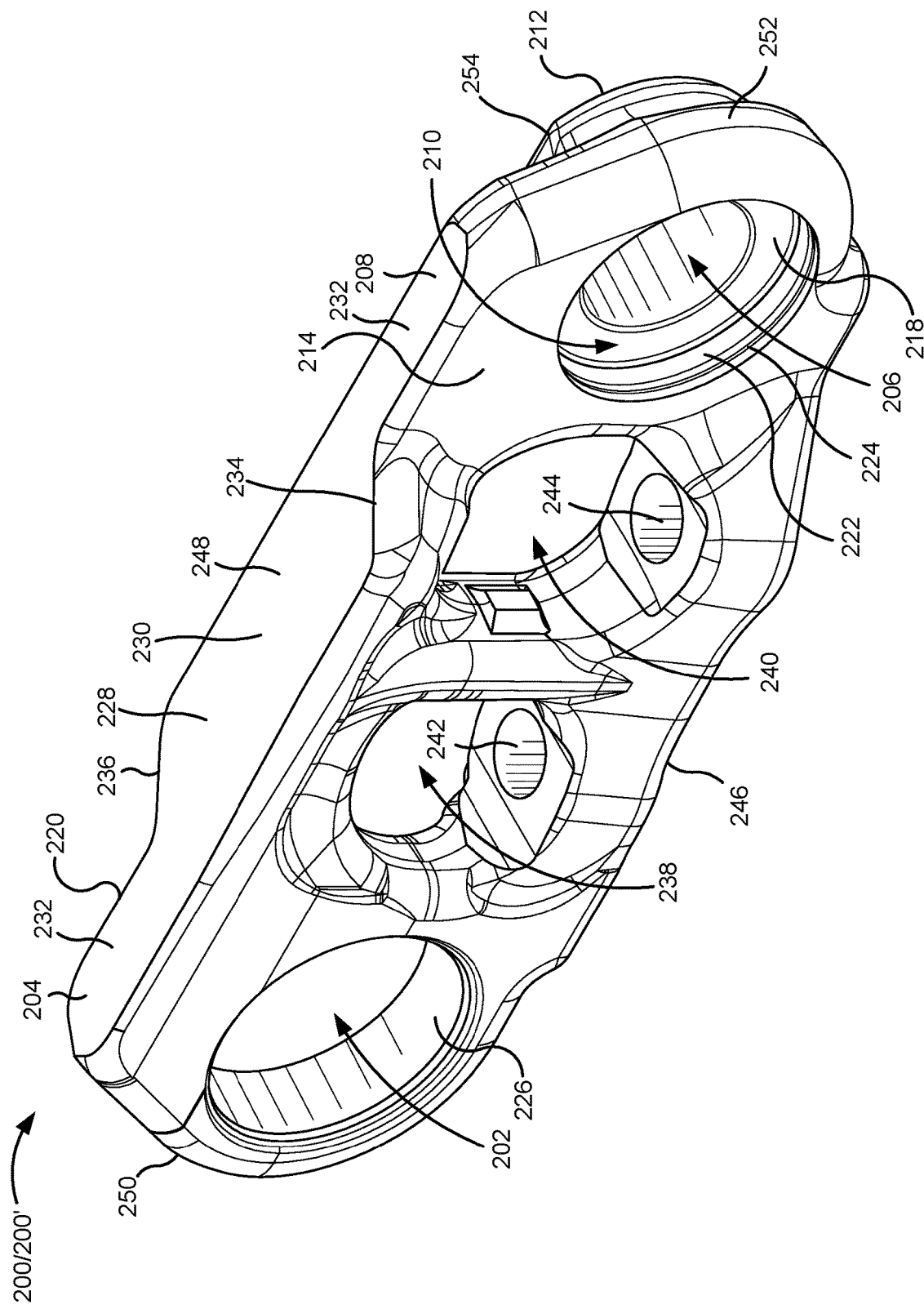
FIG. 8 is a diagram of a perspective view of a track link described herein.

FIG. 8 is a diagram of a perspective view of a track link 200 described herein. The track link 200 (e.g., the first track link 200 and/or the second track link 200') depicted in FIG. 8 may include the groove 224 that is configured to receive the seal 500. In other embodiments (such as the examples depicted and described in connection with FIGS. 1-4), the track link 200 may not include the groove 224 shown in FIG. 8.

The track link 200 may include the first bore 202 and the second bore 206. The first bore may include an inner surface 226 (e.g., an inner radial surface). The first bore 202 and/or inner surface 226 may be configured to receive (e.g., rotatably receive) a pin 400 and/or a bushing 300 to pivotably join the track link 200 with another track link 200 (e.g., that is configured with the second bore 206 disposed proximate to the outer surface 220 at the first bore 202, as described in more detail elsewhere herein). As shown in FIG. 8, a body 228 of the track link 200 may have an S-shape. For example, the first end 204 and the second end 208 may be offset from one another along a plane defined by the body 228. The body 228 may include a middle portion 230 and two end portions 232 (e.g., disposed at the first end 204 and/or the second end 208). The end portions 232 may have a smaller width than the middle portion 230. For example, the body 228 may include a first transitional surface 234 (e.g., disposed on the inner surface 214) to transition from the middle portion 230 to an end portion 232 disposed at the second end 208. Similarly, the body 228 may include a second transitional surface 236 (e.g., disposed on the outer surface 220) to transition from the middle portion 230 to an end portion 232 disposed at the first end 204. In some other implementations, the track link 200 may be a straight track link (e.g., the first end 204 and the second end 208 may not be offset from one another and/or the body 228 may not include the first transitional surface 234 or the second transitional surface 236).

The track link 200 (e.g., and/or the body 228) may include a first aperture 238 and/or a second aperture 240. The first aperture 238 and/or the second aperture 240 may extend through the body 228 from the inner surface 214 of the body 228 to the outer surface 220 of the body 228. The first aperture 238 and/or the second aperture 240 may be disposed on the middle portion 230 of the body 228. The first link 200 may include a third aperture 242 and/or a fourth aperture 244. For example, the third aperture 242 may extend from a bottom surface 246 of the body 228 to the first aperture 238. The fourth aperture 244 may extend from the bottom surface 246 to the second aperture 240. The first aperture 238 and/or the second aperture 240 may enable a member to extend through the third aperture 242 and/or the fourth aperture 244, such as a bolt and/or a screw, among other examples. For example, the bottom surface 246 may be configured to receive a track shoe 114. The member(s) may secure the track shoe 114 to the track link 200. A top surface 248 of the body 228 may be configured to engage with a track roller 118 and/or a roller assembly of a track roller 118.

The first end 204 may include a first rounded end 250. Similarly, the second end 208 may include a second rounded end 252. The first rounded end 250 and/or the second rounded end 252 may have a similar curvature to a radius of the first bore 202 and/or the second bore 206. The first rounded end 250 and/or the second rounded end 252 may have a constant radius. The first rounded end 250 and/or the second rounded end 252 may have a varying or changing radius.

The track link 200 may include a protrusion 254 extending from the outer surface 220. The protrusion 254 may be disposed proximate to the second bore 206. For example, the second bore 206 may extend through the protrusion 254. For example, the outer end 212 may be located on the protrusion 254. The protrusion 254 may be configured to receive a pin 400.

The counterbore 210 of the track link 200 may extend into the body 228 (e.g., at a distance of the depth 216) from the inner surface 214. The counterbore 210 may be concentric with the second bore 206. The counterbore may not extend through the entire body 228 of the track link 200. For example, the counterbore 210 may extend the depth 216, as defined by the axial surface 218. The counterbore 210 may include the inner radial surface 222. The inner radial surface 222 may define a diameter of the counterbore 210. The diameter of the counterbore 210 may range from approximately 50 millimeters to approximately 86 millimeters. The diameter of the counterbore 210 may depend on an outer diameter of the bushing 300. For example, the counterbore 210 and/or the inner radial surface 222 may be configured to receive (e.g., rotatably receive) the bushing 300.

The groove 224 may extend radially around the inner radial surface 222 of the counterbore 210 (e.g., radially around an axis defined by the counterbore 210 and/or the second bore 206). For example, the groove 224 may extend a distance into the inner radial surface 222. The groove 224 may have similar features and/or dimensions as described above in connection with the 314 of the bushing 300. The counterbore 210 may be configured to receive the bushing 300, such that an axial end of the bushing 300 engages with (e.g., contacts and/or mates with) the axial surface 218. Therefore, the seal 500, configured at least partially in the groove 224, may form the radial seal of the track link joint 120 between the inner radial surface 222 and the outer surface 308 of the bushing 300.

Figure 9:
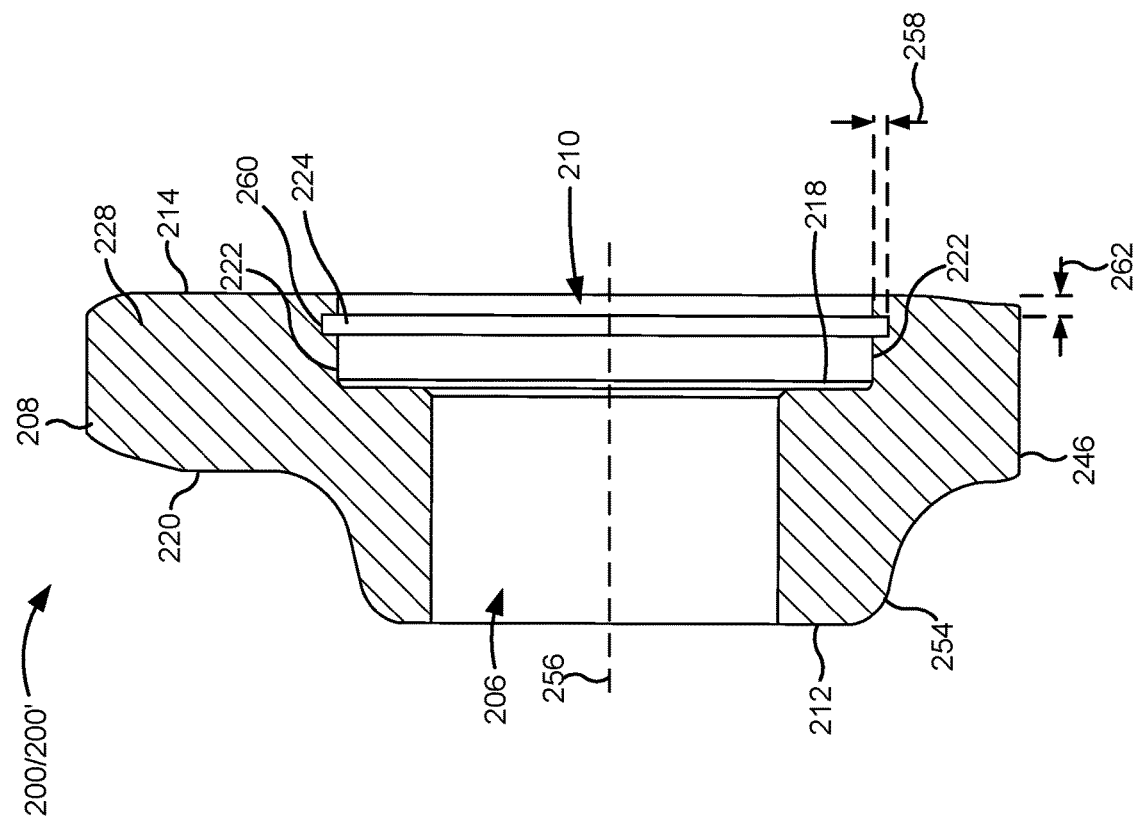
FIG. 9 is a diagram of cross section view of a track link described herein.

FIG. 9 is a diagram of cross section view of a track link 200 described herein. The cross section view of the track link 200 shown in FIG. 9 (and FIG. 10) may be at the second end 208 of the track link 200. For example, the cross section view of the track link 200 shown in FIG. 9 (and FIG. 10) depicts the second bore 206 and the counterbore 210 of the track link 200. The second bore 206 and/or the counterbore 210 may define an axis 256.

The inner radial surface 222 of the counterbore 210 may extend radially around the axis 256. The groove 224 may be disposed in the inner radial surface 222 and extend radially around the axis 256. For example, the groove 224 may extend a first distance 258 from the inner radial surface 222 (e.g., into the body 228). The first distance 258 may be based on a size or geometry of the seal 500 to be configured with the track link 200 in the track link joint 120. For example, the first distance 258 may be less than a radius or width of the seal 500. For example, the groove 224 may include a radial face 260. The radial face 260 may define a first diameter of the groove 224. The inner radial surface 222 may define a second diameter of the counterbore 210 (e.g., ranging from 30 millimeters to 180 millimeters). The second diameter may be based on the outer diameter of the bushing 300. The first diameter (e.g., of the groove 224) may be greater than the second diameter (e.g., of the counterbore 210).

For example, the first distance 258 may define a depth of the groove 224. The depth may enable the seal 500 to extend at least partially radially outward from the inner radial surface 222 to enable the seal 500 to form the radial seal of the track link joint 120. A first geometry of a cross section of the groove 224 may correspond to (e.g., may be the same as, may be similar to, or may be configured to receive) a second geometry of the cross section 502 of the seal 500.

The groove 224 may be disposed a second distance 262 from the inner surface 214. The second distance 262 may range from approximately 0 millimeters (e.g., 0.1 millimeters) to approximately 9 millimeters. For example, the groove 224 may be disposed anywhere along the inner radial surface 222. This ensures that the radial seal of the track link joint 120 is formed before an interface between the inner surface 214 of the track link joint 120 and an outer surface 220 of another track link 200 (e.g., to ensure that lubricant is prevented from leaking via the interface between the two track link joints 200).

Figure 10:
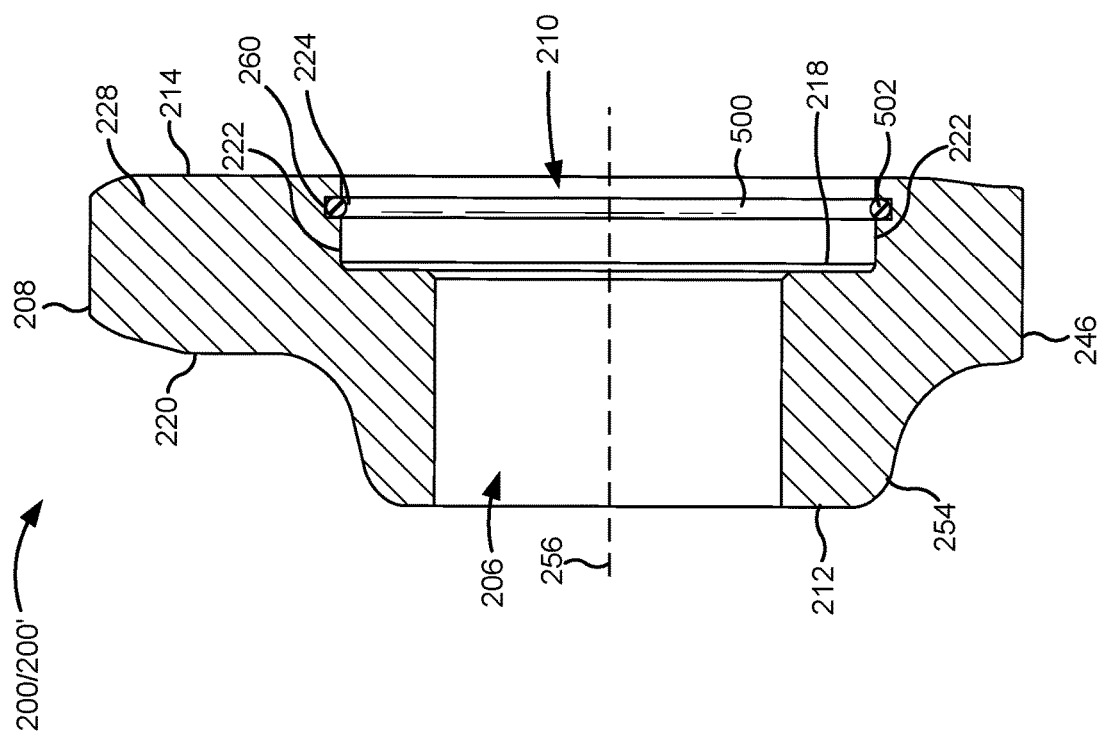
FIG. 10 is a diagram of cross section view of a track link and a seal described herein.

As shown in FIGS. 9 and 10, a diameter of the counterbore 210 may be greater than a diameter of the second bore 206. For example, the diameter of the counterbore 210 may be configured to receive the bushing 300, whereas the diameter of the second bore 206 may be configured to receive the pin 400.

FIG. 10 is a diagram of cross section view of a track link 200 and a seal 500 described herein. The seal 500 may be configured (e.g., at least partially) within the groove 224 of the track link 200. For example, as shown in FIG. 10, the depth of the groove 224 may enable the seal 500 to extend, at least partially, from (e.g., away from) the inner radial surface 222 of the counterbore 210. Therefore, when a bushing 300 is received (e.g., rotatably received) by the counterbore 210 and/or the inner radial surface 222, the seal 500 may form a radial seal (e.g., a dynamic radial seal) between the inner radial surface 222 and the outer surface 308 of the bushing 300.

INDUSTRIAL APPLICABILITY

As machines become heavier and increase in horsepower, undercarriage link assemblies of a track chain are susceptible to even greater risk of component fatigue and wear. In some cases, one or more seals may be included in the track chain assemblies (e.g., in track link joints 120) to allow the various components, such as track links, pins, and/or bushings, to rotate relative to each other while sealing in lubricant to prolong the useful life of the rotating or oscillating joints of the track chain assemblies. Over time, the load exerted on the bushings 300 and pins 400 of track link joints 120 may cause the seals associated with the bushings 300 and track links 200 to become damaged, allowing the lubricant to leak out. This may lead to wear problems for the moving components of the track chain. For example, axial seals may be utilized between an axial end of a bushing 300 (e.g., the first end 302 and/or the second end 304) and a face of a track link 200 (e.g., the axial surface 218 of the counterbore 210) to seal lubricant between an interface of the bushing 300 and a pin 400 on the track link joint 120. Axial load caused by movement of the bushing 300 (e.g., in the axial direction) may cause these axial seals to be become compressed, which may cause the axial seals to fail. For example, compression setting may cause an axial seal to fail to return to the axial seal's original size after experiencing a compressive force. Because the axial seal does not return to the original size, lubricant may leak from the track link joint 120 and/or material (e.g., earth, dirt, sand, and/or mud) may enter the interface of the bushing 300 and the pin 400, which may cause excessive wear and/or may cause the bushing 300 and/or the pin 400 to seize (e.g., to be prevented from rotating relative to one another).

Some implementations described herein enable a radial seal for a track link joint. For example, the radial seal may be disposed between an outer surface (e.g., outer surface 308) of a bushing and an inner surface (e.g., an inner radial surface) of a counterbore of a track link. For example, rather than the seal being located closer to the interface being sealed (e.g., the interface 312 between the bushing 300 and the pin 400), such as at an axial end of the bushing, the radial seal may be disposed radially along the outer surface of the bushing to reduce a compressive load experienced by the seal. The radial seal may be a dynamic radial seal to enable rotation of components of the track link joint to rotate relative to one another. For example, the track link joint may include two track links pivotably joined together (e.g., via the bushing and/or the pin). Therefore, the radial seal may be disposed within a groove of the bushing and/or a groove of the track link (e.g., a groove in an inner surface of the counterbore) to ensure that the seal remains in place during rotation of the components and to ensure that the components of the track link joint are enabled to rotate or move relative to one another.

As a result, the radial seal may experience a lower (or no) compressive force during operation due to the axial movement of the bushing (and/or other components of the track link joint). Reducing the compressive force experienced by the dynamic seal of the track link joint may reduce a likelihood that the seal fails due to a compression set experienced by the seal. This may prolong a life of the seal and increase a likelihood that lubricant is prevented from leaking from the track link joint and/or ensure that material is prevented from entering into the track link joint. This may prolong the life of the components of the track link joint by ensuring that the moving components are properly lubricated. Additionally, this may ensure that undesirable material (such as earth, dirt, sand, and/or mud) does not enter into the track link joint and cause wear or prevent a movement of the components of the track link joint.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. A bushing for a track link joint, comprising:
   a cylindrical body having an at least partially annular configuration, the cylindrical body defining a radial axis, the cylindrical body including an inner circumferential surface, an outer circumferential surface, a first end, and a second end,
       wherein the inner circumferential surface is configured to rotatably receive an outer surface of a pin of the track link joint, and
       wherein the outer circumferential surface is configured to be rotatably received within a first counterbore of a first track link of the track link joint; and
   at least one groove extending radially into the outer circumferential surface around the radial axis,
       wherein the at least one groove includes a first groove that is configured to receive a first seal of the track link joint,
       wherein the first groove is proximate to the first end and axially offset from the first end, and
       wherein the first seal forms a first radial seal between the outer circumferential surface and a first inner surface of the first counterbore.

2. The bushing of claim 1,
   wherein the first groove radially extends into the outer circumferential surface,
   wherein the at least one groove further includes a second groove proximate to the second end and radially extending into the outer circumferential surface,
   wherein the first groove is configured to receive the first seal, and
   wherein the second groove is configured to receive a second seal.

3. The bushing of claim 2,
   wherein the outer circumferential surface is configured to be rotatably received, at the first end, within the first counterbore of the first track link,
   wherein the outer circumferential surface is configured to be rotatably received, at the second end, within a second counterbore of a second track link,
   wherein the first seal forms the first radial seal, proximate to the first end, between the outer circumferential surface and the first inner surface of the first counterbore, and
   wherein the second seal forms a second radial seal between the outer circumferential surface and a second inner surface of the second counterbore.

4. The bushing of claim 1,
   wherein the inner circumferential surface defines an inner diameter of the bushing ranging from 24 millimeters to 170 millimeters, and
   wherein the outer circumferential surface defines an outer diameter of the bushing ranging from 30 millimeters to 180 millimeters.

5. The bushing of claim 1, wherein the first groove has a depth that enables the first seal to extend at least partially radially outward from the outer circumferential surface.

6. The bushing of claim 1, wherein a first size of the first groove is based on a second size of the first seal.

7. The bushing of claim 1,
   wherein the cylindrical body defines an axial direction, and
   wherein the first groove is located proximate to the first end along the axial direction, and
   wherein a distance between the first groove and the first end ranges from more than 0 millimeters to 20 millimeters.

8. A track link joint sealing system, comprising:
   a first track link including:
       a first body including a first inner surface and a first outer surface;
       a counterbore extending into the first inner surface of the first body, the counterbore defining a radial axis; and
       a first bore extending through the first body, the first bore configured about the radial axis;
   a second track link pivotably joined to the first track link via a bushing and a pin, the second track link including a second body and a second bore extending through the second body;
   the bushing rotatably configured within the counterbore and the first bore,
       the bushing including a first cylindrical body having an at least partially annular configuration,
       the first cylindrical body including a first inner circumferential surface and a first outer circumferential surface, and
       the first outer circumferential surface being configured to extend through the second bore and being configured to be rotatably received within the counterbore;
   the pin configured within the bushing,
       the pin including a second cylindrical body,
       the second cylindrical body including a second outer circumferential surface,
       the second outer circumferential surface defining a first interface with the first inner circumferential surface, and
       the pin being configured to at least partially extend through the first bore and the second bore; and
   a seal disposed at a second interface between the first outer circumferential surface of the bushing and an inner radial surface of the counterbore,
       the seal being enclosed by the first outer circumferential surface of the bushing and the inner radial surface of the counterbore,
       the seal forming a radial seal between the first outer circumferential surface and the inner radial surface of the counterbore, and
       the radial seal being configured to prevent material from entering into, or exiting from, the first interface.

9. The track link joint sealing system of claim 8, wherein the bushing includes a groove extending into the first outer circumferential surface,
   the groove extending radially around the first cylindrical body; and wherein the seal is at least partially configured within the groove.

10. The track link joint sealing system of claim 9,
    wherein the first cylindrical body defines an axial direction,
    wherein the counterbore extends a first distance into the first inner surface of the first body, and
    wherein the groove is disposed at a second distance, along the axial direction, from an axial end of the bushing that ranges from 0 millimeters to the first distance.

11. The track link joint sealing system of claim 10, wherein the first distance ranges from 8 millimeters to 20 millimeters.

12. The track link joint sealing system of claim 8, wherein the first track link includes a groove extending into the inner radial surface of the counterbore,
the groove extending radially around the inner radial surface; and wherein the seal is at least partially configured within the groove.

13. The track link joint sealing system of claim 8, wherein the radial seal is a dynamic radial seal configured to enable at least one of the bushing or the pin to rotate about the radial axis relative to the first track link.

14. The track link joint sealing system of claim 8,
wherein the seal extends at least partially radially outward from the first outer circumferential surface, and
wherein the seal is configured to contact the inner radial surface of the counterbore to form the radial seal.

15. The track link joint sealing system of claim 8, wherein the seal is an O-ring seal.

16. A track link for a track link joint, comprising:
a body including an inner surface, an outer surface, a first end, and a second end;
a bore extending through the body from the inner surface to the outer surface,
wherein the bore is displaced proximate to the first end,
wherein the bore defines a radial axis, and
wherein the bore is configured to rotatably receive a pin of the track link joint;
a counterbore extending into the inner surface about the radial axis,
wherein the counterbore includes an axial surface and an inner radial surface, and
wherein the counterbore is configured to rotatably receive a bushing of the track link joint; and
a groove extending radially into the inner radial surface around the radial axis,
wherein the groove is configured to receive a seal of the track link joint, and
wherein the seal forms a radial seal enclosed by the groove and an outer circumferential surface of the bushing.

17. The track link of claim 16, wherein the groove is disposed a distance from the inner surface,
the distance ranging from 0.1 millimeters to 20 millimeters.

18. The track link of claim 16, wherein the groove has a depth that enables the seal to extend at least partially radially outward from the inner radial surface to enable the seal to form the radial seal.

19. The track link of claim 16, wherein a first size of the groove is based on a second size of the seal.

20. The track link of claim 16,
wherein the groove includes a radial face,
wherein the radial face defines a first diameter of the groove, wherein the inner radial surface defines a second diameter of the counterbore ranging from 30 millimeters to 180 millimeters, and
wherein the first diameter is greater than the second diameter.

* * * * *